(12) United States Patent
Lee

(10) Patent No.: US 12,722,041 B2
(45) Date of Patent: Sep. 1, 2026

(54) METHOD, SYSTEM, AND NON-TRANSITORY COMPUTER-READABLE RECORDING MEDIUM FOR ESTIMATING INFORMATION ON GOLF SWING POSTURE

(71) Applicant: MOAIS, INC., Seoul (KR)

(72) Inventor: Yong Geun Lee, Seoul (KR)

(73) Assignee: MOAIS, INC., Seoul (KR)

( * ) Notice: Subject to any disclaimer, the term of this patent is extended or adjusted under 35 U.S.C. 154(b) by 315 days.

(21) Appl. No.: 18/031,175

(22) PCT Filed: Sep. 13, 2021

(86) PCT No.: PCT/KR2021/012389
§ 371 (c)(1),
(2) Date: Jun. 7, 2023

(87) PCT Pub. No.: WO2022/080678
PCT Pub. Date: Apr. 21, 2022

(65) Prior Publication Data

US 2023/0381584 A1 Nov. 30, 2023

(30) Foreign Application Priority Data

Oct. 15, 2020 (KR) ........................ 10-2020-0133209

(51) Int. Cl.
*A63B 24/00* (2006.01)
*G06T 7/246* (2017.01)
(Continued)

(52) U.S. Cl.
CPC .......... *A63B 24/0006* (2013.01); *G06T 7/248* (2017.01); *G06T 7/74* (2017.01);
(Continued)

(58) Field of Classification Search
CPC ........ A63B 24/0006; A63B 2024/0012; A63B 2102/32; A63B 2220/05; A63B 2220/807; A63B 2230/62; A63B 24/0021; A63B 69/36; G06T 7/248; G06T 7/74; G06T 2207/20076; G06T 2207/20084;
(Continued)

(56) References Cited

U.S. PATENT DOCUMENTS

2014/0169764 A1* 6/2014 Behan ...................... H04N 9/87
386/278
2021/0089761 A1* 3/2021 Tyomkin ................ G06V 40/23

FOREIGN PATENT DOCUMENTS

JP 2017029460 A 2/2017
KR 1020040000853 A 1/2004
(Continued)

*Primary Examiner* — Michael C Grant
(74) *Attorney, Agent, or Firm* — Dinsmore & Shohl LLP; Yongsok Choi, Esq.

(57) ABSTRACT

A method for estimating information on a golf swing posture is provided. The method includes the steps of: adjusting a determination criterion for a golf swing of a user on the basis of information associated with the user's golf swing; and estimating information on a golf swing posture of the user on the basis of the adjusted determination criterion, wherein the information associated with the user's golf swing includes at least one of a photographed image of the user's golf swing and information on a swing posture of a comparison target golfer selected by the user.

13 Claims, 1 Drawing Sheet

(51) Int. Cl.
*G06T 7/73* (2017.01)
*A63B 102/32* (2015.01)

(52) U.S. Cl.
CPC ... *A63B 2024/0012* (2013.01); *A63B 2102/32* (2015.10); *A63B 2220/05* (2013.01); *A63B 2220/807* (2013.01); *A63B 2230/62* (2013.01); *G06T 2207/20076* (2013.01); *G06T 2207/20084* (2013.01); *G06T 2207/30196* (2013.01); *G06T 2207/30224* (2013.01); *G06T 2207/30241* (2013.01)

(58) Field of Classification Search
CPC . G06T 2207/30196; G06T 2207/30224; G06T 2207/30241; G06T 7/70; G06T 7/20; G06T 2207/30221; G06N 3/0464; A61B 5/1122; A61B 5/1128; A61B 5/1116; G06V 10/82; G06V 40/23; G09B 19/0038
USPC .......................................................... 473/131
See application file for complete search history.

(56) References Cited

FOREIGN PATENT DOCUMENTS

| | | | |
|---|---|---|---|
| KR | 1020150025833 | A | 3/2015 |
| KR | 1020160121379 | A | 10/2016 |
| KR | 1020200115729 | A | 10/2020 |

* cited by examiner

METHOD, SYSTEM, AND NON-TRANSITORY COMPUTER-READABLE RECORDING MEDIUM FOR ESTIMATING INFORMATION ON GOLF SWING POSTURE

CROSS-REFERENCE TO RELATED APPLICATION(S)

This application is a national phase of Patent Cooperation Treaty (PCT) International Application No. PCT/KR2021/012389 filed on Sep. 13, 2021, which claims priority to Korean Patent Application No. 10-2020-0133209 filed on Oct. 15, 2020. The entire contents of PCT International Application No. PCT/KR2021/012389 and Korean Patent Application No. 10-2020-0133209 are hereby incorporated by reference.

FIELD OF THE INVENTION

The present invention relates to a method, device, and non-transitory computer-readable recording medium for estimating information on a golf swing posture.

BACKGROUND

As golf has become more popular in recent years, techniques for analyzing images of a golfer's swing and providing useful information to the golfer have been introduced.

As an example of related conventional techniques, Korean Laid-Open Patent Publication No. 2009-105031 discloses a golf clinic system employing image processing techniques and an operation method thereof, the system comprising: a plurality of markers attached to a body and a golf club of a golf practitioner; a plurality of cameras for collecting images of a swing motion of the golf practitioner; an image analyzer for reconstructing two-dimensional images collected from the plurality of cameras into three-dimensional images, extracting spatial coordinates of the markers according to movements, and analyzing angular values of parts of the body and data for each stage in real time to output a clinic result in a report format; and a database in which kinematic clinic information on the swing motion is matched with member information and stored as digital data.

However, according to the techniques introduced so far as well as the above-described conventional technique, it is necessary to separately use an expensive instrument for recognizing a golfer's posture and motion, or to attach separate sensors (or markers) to the golfer's body and golf club, in order to analyze the golfer's swing.

Meanwhile, a determination criterion is required to analyze a golf swing posture. For example, if the x-coordinate of the left knee at the moment of an impact detected from a two-dimensional image of the golfer's swing is away from the x-coordinate of the left ankle in an address posture detected from the two-dimensional image of the golfer's swing at or above a predetermined distance (i.e., determination criterion), the swing (or the golf ball flight according to the swing) may be determined to be a slice. However, the determination criterion cannot be uniformly defined and needs to be appropriately adjusted in consideration of the golfer's body structure, swing characteristics, or swing tendencies, the situation in which the golf swing is photographed, and the like. However, the techniques introduced so far as well as the above-described conventional technique have failed to propose a technique for appropriately adjusting a determination criterion according to a golfer and a photographing situation.

SUMMARY OF THE INVENTION

One object of the present invention is to solve all the above-described problems in prior art.

Another object of the invention is to adjust a determination criterion for a golf swing of a user on the basis of information associated with the user's golf swing, and estimate information on a golf swing posture of the user on the basis of the adjusted determination criterion, wherein the information associated with the user's golf swing includes at least one of a photographed image of the user's golf swing and information on a swing posture of a comparison target golfer selected by the user.

Yet another object of the invention is to estimate information on a golf swing posture in an accurate and customized manner by adjusting a determination criterion according to a user and a photographing situation when analyzing the user's golf swing posture.

Still another object of the invention is to light-weight an artificial neural network model using depthwise convolution and pointwise convolution, and estimate at least one joint of a user from a photographed image of the user's golf swing using the light-weighted artificial neural network model.

The representative configurations of the invention to achieve the above objects are described below.

According to one aspect of the invention, there is provided a method comprising the steps of: adjusting a determination criterion for a golf swing of a user on the basis of information associated with the user's golf swing; and estimating information on a golf swing posture of the user on the basis of the adjusted determination criterion, wherein the information associated with the user's golf swing includes at least one of a photographed image of the user's golf swing and information on a swing posture of a comparison target golfer selected by the user.

According to another aspect of the invention, there is provided a device comprising: a determination criterion adjustment unit configured to adjust a determination criterion for a golf swing of a user on the basis of information associated with the user's golf swing; and a swing information estimation unit configured to estimate information on a golf swing posture of the user on the basis of the adjusted determination criterion, wherein the information associated with the user's golf swing includes at least one of a photographed image of the user's golf swing and information on a swing posture of a comparison target golfer selected by the user.

In addition, there are further provided other methods and devices to implement the invention, as well as non-transitory computer-readable recording media having stored thereon computer programs for executing the methods.

According to the invention, it is possible to adjust a determination criterion for a golf swing of a user on the basis of information associated with the user's golf swing, and estimate information on a golf swing posture of the user on the basis of the adjusted determination criterion.

According to the invention, it is possible to estimate information on a golf swing posture in an accurate and customized manner by adjusting a determination criterion according to a user and a photographing situation when analyzing the user's golf swing posture.

According to the invention, it is possible to light-weight an artificial neural network model using depthwise convolution and pointwise convolution, and estimate at least one joint's position of a user from a photographed image of the user's golf swing using the light-weighted artificial neural network model in a mobile device, thereby accurately and efficiently estimating information on the user's golf swing posture in the mobile device, without using any separate sensor or instrument.

DETAILED DESCRIPTION

Figure 1:
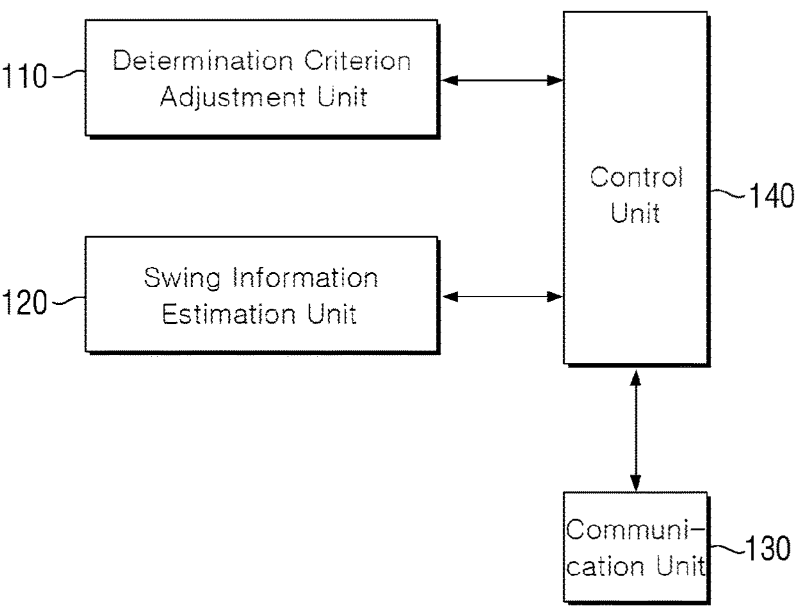
FIG. 1 specifically shows the internal configuration of a device according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Although embodiments related to a golf swing are described herein focusing on a full swing, the golf swing according to the invention should be understood in the broadest sense as encompassing all motions for moving a golf club. For example, the golf swing according to one embodiment of the invention may include a full swing, a half swing, a chip shot, a lobe shot, and a putt.

Although the descriptions herein are focused on golf, it will be apparent to those skilled in the art that the present invention may be utilized even for estimating information on motions performed in sports other than golf. For example, the present invention may be utilized for estimating information on a baseball swing or information on a workout or yoga posture.

Although the descriptions herein are focused on detecting joints from a photographed image of a user's golf swing for ease of understanding, it should be understood that the present invention is not limited to detecting joints and may be utilized even for detecting body parts other than joints.

Configuration of a Device

Hereinafter, the internal configuration of a device 100 crucial for implementing the invention and the functions of the respective components thereof will be discussed.

FIG. 1 specifically shows the internal configuration of the device 100 according to one embodiment of the invention.

As shown in FIG. 1, the device 100 according to one embodiment of the invention may comprise a determination criterion adjustment unit 110, a swing information estimation unit 120, a communication unit 130, and a control unit 140. According to one embodiment of the invention, at least some of the determination criterion adjustment unit 110, the swing information estimation unit 120, the communication unit 130, and the control unit 140 may be program modules to communicate with an external system (not shown). The program modules may be included in the device 100 in the form of operating systems, application program modules, or other program modules, while they may be physically stored in a variety of commonly known storage devices. Further, the program modules may also be stored in a remote storage device that may communicate with the device 100. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the device 100 has been described as above, and it will be apparent to those skilled in the art that at least a part of the components or functions of the device 100 may be implemented in a server (not shown) or included in an external system (not shown), as necessary.

Meanwhile, the device 100 according to one embodiment of the invention is digital equipment having a memory means and a microprocessor for computing capabilities, and may include smart phones, tablets, smart watches, smart bands, smart glasses, desktop computers, notebook computers, workstations, personal digital assistants (PDAs), web pads, and mobile phones. However, the device 100 is not limited to the examples mentioned above, and may be changed without limitation as long as the objects of the invention may be achieved.

In particular, the device 100 may include an application (not shown) for assisting a user to receive services such as estimation of information on a golf swing from the device 100. The application may be downloaded from an external application distribution server (not shown). Meanwhile, the characteristics of the application may be generally similar to those of the determination criterion adjustment unit 110, the swing information estimation unit 120, the communication unit 130, and the control unit 140 of the device 100 to be described below. Here, at least a part of the application may be replaced with a hardware device or a firmware device that may perform a substantially equal or equivalent function, as necessary.

First, the determination criterion adjustment unit 110 according to one embodiment of the invention may function to adjust a determination criterion for a golf swing of a user on the basis of information associated with the user's golf swing.

Specifically, according to one embodiment of the invention, the information associated with the user's golf swing may include at least one of a photographed image of the user's golf swing and information on a swing posture of a comparison target golfer selected by the user.

More specifically, according to one embodiment of the invention, the photographed image of the user's golf swing may be photographed by the device 100, or may be photographed by another device (not shown) and acquired by the device 100. Further, according to one embodiment of the invention, the photographed image of the user's golf swing may be a two-dimensional image photographed by an RGB camera. That is, the determination criterion adjustment unit 110 according to one embodiment of the invention may estimate a position of at least one joint of the user using only the two-dimensional photographed image of the user's golf swing, without using depth information acquired from an instrument such as a depth camera or a depth sensor. Meanwhile, the photographed image of the user's golf swing according to the invention mainly refers to a moving picture, but should be understood in the broadest sense as encompassing all data that may represent a user's golf swing in visual forms regardless of their formats. Further, according to one embodiment of the invention, the photographed image of the user's golf swing may include a trajectory of a golf ball according to the user's golf swing in addition to the user's golf swing posture.

Meanwhile, the information on the swing posture of the comparison target golfer selected by the user according to one embodiment of the invention will be described later.

Meanwhile, the determination criterion adjustment unit 110 according to one embodiment of the invention may function to adjust a determination criterion for the user's golf swing on the basis of information on the user's actual body, which is estimated from the photographed image of the user's golf swing using an artificial neural network model.

Specifically, the determination criterion adjustment unit 110 according to one embodiment of the invention may detect at least one joint of the user from the photographed image of the user's golf swing using an artificial neural network model. Further, the determination criterion adjustment unit 110 according to one embodiment of the invention may estimate the information on the user's actual body with reference to the at least one detected joint of the user. Here, according to one embodiment of the invention, the information on the user's actual body may include, but is not limited to, dimensions of the user's actual body (e.g., an actual height, actual arm length, and actual leg length).

For example, the determination criterion adjustment unit 110 according to one embodiment of the invention may detect the y-coordinates of both shoulder joints and a foot joint of the user from a two-dimensional photographed image of the user's golf swing using an artificial neural network model, and calculate the y-coordinates of the center of the shoulder joints and the sole of the foot to estimate the user's actual height. Here, the determination criterion adjustment unit 110 according to one embodiment of the invention may recognize a type and/or length of a golf club from the two-dimensional photographed image of the user's golf swing using the artificial neural network model, and estimate the user's actual height with further reference to the recognized type and/or length of the golf club.

As another example, the determination criterion adjustment unit 110 according to one embodiment of the invention may detect arm joints of the user from a two-dimensional photographed image of the user's golf swing using an artificial neural network model, and calculate the user's arm length on the basis of the detected arm joints of the user to estimate the user's actual height. Here, the determination criterion adjustment unit 110 according to one embodiment of the invention may recognize a type and/or length of a golf club from the two-dimensional photographed image of the user's golf swing using the artificial neural network model, and estimate the user's actual height with further reference to the recognized type and/or length of the golf club.

Meanwhile, the determination criterion adjustment unit 110 according to one embodiment of the invention may adjust a determination criterion for the user's golf swing on the basis of the estimated information on the user's actual body.

Specifically, the determination criterion adjustment unit 110 according to one embodiment of the invention may adjust the determination criterion for the user's golf swing by normalizing the user's actual height on the basis of the estimated information on the user's actual body and multiplying it by a default determination criterion. According to one embodiment of the invention, by adjusting the determination criterion as above, accurate information on the user's golf swing posture may be estimated in consideration of both the photographing distance and the information on the user's actual body.

For example, in the case of determining whether a head-up occurs at a top-of-swing, it may be assumed by default that a head-up is determined to occur when a position of the head at the top-of-swing is detected as being ten pixels (i.e., a default determination criterion) or more above a position of the head in an address posture. In this case, the ten pixels may indicate a situation in which the head is only slightly raised if the user is tall. Thus, the determination criterion adjustment unit 110 according to one embodiment of the invention may multiply a normalized value of the user's height (in this case, a value greater than 1) by the default determination criterion (i.e., ten pixels), so that whether a head-up occurs is not determined too strictly.

Continuing with the example, when a swing of a user with an average height is photographed at a very close distance from the device 100, the head position at the top-of-swing may be detected as being ten pixels or more above the head position in the address posture even though the head is actually only slightly raised. In this case, the determination criterion adjustment unit 110 according to one embodiment of the invention may multiply a normalized value of the user's height (in this case, a value greater than 1) by the default determination criterion (i.e., ten pixels) in consideration of the photographing distance, so that whether a head-up occurs is not determined too strictly.

Meanwhile, according to one embodiment of the invention, the determination criterion for the user's golf swing may be a specific value as described above but may also refer to a specific range or a relationship between the user's joints, and may be diversely changed as long as the objects of the invention may be achieved.

Meanwhile, the artificial neural network model according to one embodiment of the invention may include, for example, a convolutional neural network (CNN) model, a recurrent neural network (RNN) model, a deep belief network (DBN) model, or an artificial neural network model in which the foregoing models are combined. However, the artificial neural network model according to one embodiment of the invention is not limited to those mentioned above, and may be diversely changed as long as the objects of the invention may be achieved.

Further, the artificial neural network model according to one embodiment of the invention may be a model that is light-weighted using depthwise convolution and pointwise convolution.

In addition, the artificial neural network model according to one embodiment of the invention may be a model that is light-weighted using a light-weighting algorithm such as pruning, weight quantization, and residual learning.

Specifically, since artificial neural network models commonly used in object recognition technology require a high level of computing resources to be consumed for a high level of recognition performance, it is often difficult to use such models in environments where only limited computing resources are provided (e.g., mobile devices). Therefore, according to one embodiment of the invention, an artificial neural network model may be light-weighted using depthwise convolution and pointwise convolution, and the light-weighted artificial neural network model may be used in a mobile device so that at least one joint of a user may be detected from a photographed image of the user's golf swing.

Here, the depthwise convolution according to one embodiment of the invention may refer to a convolution process in which a kernel is applied for each depth (i.e., each channel) of an input layer, in performing convolution in the artificial neural network model according to one embodiment of the invention. Meanwhile, since the method of operation using the applied kernel is the same as that of general convolution, a detailed description thereof will be omitted.

Further, the pointwise convolution according to one embodiment of the invention may refer to a convolution process in which a kernel of size 1×1×M (i.e., a kernel of width 1, height 1, and depth M) is applied for each point of an input layer, in performing convolution in the artificial neural network model according to one embodiment of the invention.

Figure 2A:
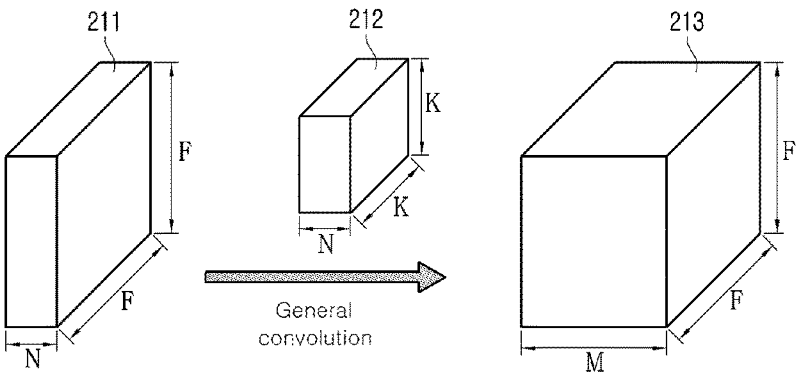
FIG. 2A illustratively shows how general convolution is performed according to one embodiment of the invention.

FIG. 2A illustratively shows how general convolution is performed according to one embodiment of the invention.

Figure 2B:
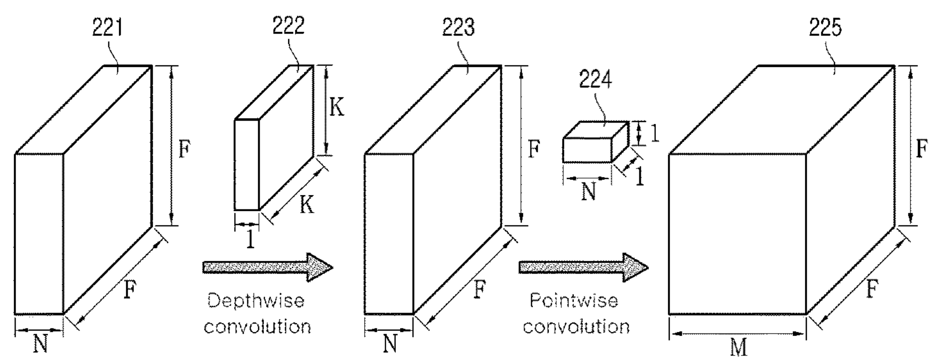
FIG. 2B illustratively shows how depthwise convolution and pointwise convolution are performed according to one embodiment of the invention.

FIG. 2B illustratively shows how depthwise convolution and pointwise convolution are performed according to one embodiment of the invention.

Referring to FIG. 2A, according to one embodiment of the invention, it may be assumed that the width, height, and depth of an input layer 211 are F, F, and N, respectively; the width, height, and depth of each kernel 212 are K, K, and N, respectively; and the width, height, and depth of an output layer 213 are F, F, and M, respectively. Here, it is assumed that padding and stride are appropriately sized such that there is no change in the width and height of the input layer 211 and the output layer 213. In this case, in the general convolution, the kernel 212 is applied to the input layer 211 to constitute one depth of the output layer 213 (through F×F×K×K×N operations), and these operations are performed for M kernels 212 so that a total of F×F×K×K×N×M operations are performed.

Referring to FIG. 2B, according to one embodiment of the invention, it may be assumed that the width, height, and depth of an input layer 221 are F, F, and N, respectively; the width, height, and depth of each kernel 222 in the depthwise convolution are K, K, and 1, respectively; the width, height, and depth of each kernel 224 in the pointwise convolution are 1, 1, and N, respectively; and the width, height and depth of an output layer 225 are F, F, and M, respectively. In this case, the kernel 222 is applied for each depth of the input layer 221 to constitute each depth of an intermediate layer 223 (through F×F×K×K×1×N operations). Then, the kernel 224 is applied for each point of the intermediate layer 223 to constitute one depth of the output layer 225 (through F×F×1×1×N operations), and these operations are performed for M kernels 224 so that a total of F×F×1×1×N×M operations are performed in the pointwise convolution. Therefore, according to one embodiment of the invention, a total of (F×F×K×K×1×N)+(F×F×1×1×N×M) operations are performed in the depthwise convolution and the pointwise convolution, so that the amount of operations is reduced compared to the general convolution.

Meanwhile, the light-weighting algorithms according to one embodiment of the invention are not necessarily limited to the above algorithms (i.e., the depthwise convolution and the pointwise convolution), and the order or number of times of applying each of the above algorithms may also be diversely changed.

Further, the determination criterion adjustment unit 110 according to one embodiment of the invention may function to derive probability information on a position of the at least one joint of the user from the photographed image of the user's golf swing using an artificial neural network model, and adjust a determination criterion for the user's golf swing with reference to the probability information.

Specifically, the determination criterion adjustment unit 110 according to one embodiment of the invention may generate a probability map (i.e., output data of the artificial neural network model) by using the photographed image of the user's golf swing as input data of the artificial neural network model.

For example, according to one embodiment of the invention, the probability map may be a two-dimensional heat map. Further, the determination criterion adjustment unit 110 according to one embodiment of the invention may generate at least one two-dimensional heat map image for each of the at least one joint of the user using the artificial neural network model, and may derive the probability information on the two-dimensional position of the at least one joint of the user on the basis of properties such as the two-dimensional position of the at least one joint being more likely to correspond to pixels with larger values, among pixels constituting the generated at least one heat map image, or the position of the at least one joint being less likely to be accurately specified as pixels with small values are widely distributed in the heat map, and being more likely to be accurately specified as pixels with large values are narrowly distributed in the heat map.

Further, when a probability of the at least one joint of the user being located in a specific position is not greater than a threshold value, the determination criterion adjustment unit 110 according to one embodiment of the invention may adjust the determination criterion for the user's golf swing such that the information on the user's golf swing posture is not estimated. Here, according to one embodiment of the invention, the joint whose probability of being located in the specific position is not greater than the threshold value may refer to a joint associated with a particular swing posture.

For example, according to one embodiment of the invention, when a joint required to estimate information on a particular swing posture is an elbow joint, the information on the user's golf swing posture may not be estimated if a probability of the elbow joint being located in a specific position is not greater than a threshold value. However, if a probability of another joint being located in the specific position is not greater than the threshold value, the information on the user's golf swing posture may be estimated because the joint is not associated with the particular swing posture.

Further, when a probability of the at least one joint of the user being located in a specific position is not greater than a threshold value, the determination criterion adjustment unit 110 according to one embodiment of the invention may adjust the determination criterion for the user's golf swing to the largest value or the smallest value, so that the information on the user's golf swing posture is not estimated.

Meanwhile, the at least one joint of the user for which the probability information on the two-dimensional position is derived by the determination criterion adjustment unit 110 according to one embodiment of the invention may be joints essentially required for estimating information on the user's golf swing posture. That is, when the information on the user's golf swing posture is estimated, the computational efficiency of the artificial neural network model may be improved by limiting the number of joints to be detected such that joints of relatively low importance are not detected.

Meanwhile, the determination criterion adjustment unit 110 according to one embodiment of the invention may function to adjust a determination criterion for the user's golf swing on the basis of a trajectory of a golf ball according to the user's golf swing, which is estimated from the photographed image of the user's golf swing using an artificial neural network model.

Specifically, the determination criterion adjustment unit 110 according to one embodiment of the invention may estimate a trajectory of a golf ball with reference to positions of a golf club and the golf ball detected from at least a part of frames constituting the photographed image of the user's golf swing. Further, the determination criterion adjustment unit 110 according to one embodiment of the invention may determine a ball flight of the golf ball on the basis of the trajectory of the golf ball, and adjust a determination criterion for the user's golf swing with reference to the determined ball flight.

More specifically, in order to estimate a trajectory of the golf ball using the device 100, it is necessary to photograph the user's golf swing from the user's side (i.e., in a direction that allows the ball to be photographed as it flies). However, in the case of photographing with only one device 100, the golf ball will be obscured by the golf club (specifically, the head of the golf club) when the user takes an address posture. Therefore, the determination criterion adjustment unit 110 according to one embodiment of the invention may detect a position of the golf club in the address posture from the photographed image of the user's golf swing, and estimate a position of the golf ball before an impact on the basis of the detected position of the golf club. Further, the determination criterion adjustment unit 110 according to one embodiment of the invention may determine a trajectory and a ball flight of the golf ball on the basis of the position of the golf ball before the impact and the position of the golf ball detected from each of the frames after the impact. Here, the ball flight of the golf ball may include, but is not limited to, a topping, chunk shot, slice, hook, snake shot, straight, fade, and draw.

Further, when the ball flight of the golf ball corresponds to a bad ball flight such as a topping, chunk shot, slice, hook, or snake shot, the determination criterion adjustment unit 110 according to one embodiment of the invention may adjust a determination criterion for the user's golf swing such that a strict determination is made as to a swing posture associated with the corresponding ball flight. For example, when the ball flight of the golf ball is a topping, the determination criterion adjustment unit 110 according to one embodiment of the invention may tightly adjust a determination criterion for a head-up, which is a swing posture associated with the topping, such that a strict determination is made as to whether a head-up occurs, so that the head-up is determined to occur even if the user only slightly raises his/her head. In contrast, when the ball flight of the golf ball corresponds to a good ball flight such as a straight, fade, or draw, the determination criterion adjustment unit 110 according to one embodiment of the invention may loosely adjust the determination criterion for the head-up such that even if there is a problem (e.g., head-up) in the user's swing posture, the problem is not pointed out.

Meanwhile, the determination criterion adjustment unit 110 according to one embodiment of the invention may function to adjust a determination criterion for the user's golf swing with reference to characteristics of the swing posture of the comparison target golfer selected by the user, which are estimated on the basis of the information on the swing posture of the comparison target golfer.

Specifically, according to one embodiment of the invention, the information on the swing posture of the comparison target golfer selected by the user may include a photographed image of the comparison target golfer's swing. Further, the determination criterion adjustment unit 110 according to one embodiment of the invention may detect at least one joint of the comparison target golfer from the photographed image of the comparison target golfer's swing, and estimate characteristics of the comparison target golfer's swing posture on the basis of the at least one detected joint. Here, according to one embodiment of the invention, the characteristics of the comparison target golfer's swing posture may be acquired from a database (not shown) internal or external to the device 100. In this case, the characteristics of the comparison target golfer's swing posture may be those estimated in advance from a photographed image of a swing of a comparison target golfer that may be selected by the user, and then stored in the database.

For example, according to one embodiment of the invention, when a comparison target golfer selected by the user is a player A, characteristics of the player A's swinging posture may include the player A's swinging posture, characteristics of the player A's swing (e.g., whether a head-up occurs and the extent of the head-up when it occurs), and the like. However, the characteristics of the swing posture of the comparison target golfer selected by the user according to one embodiment of the invention are not limited to the foregoing, and may be diversely changed as long as the objects of the invention may be achieved.

Continuing with the example, according to one embodiment of the invention, when a comparison target golfer selected by the user is a player A who is characterized by making a severe head-up at the time of swinging, the determination criterion adjustment unit 110 according to one embodiment of the invention may loosely adjust a determination criterion for a head-up such that even if there is a head-up problem in the user's swing posture, the problem is not pointed out. In contrast, according to one embodiment of the invention, when the player A is characterized by not making a head-up at all at the time of swinging, the determination criterion adjustment unit 110 according to one embodiment of the invention may tightly adjust the determination criterion for the head-up such that a strict determination is made as to whether a head-up occurs, so that the head-up is determined to occur even if the user only slightly raises his/her head.

Next, the swing information estimation unit 120 according to one embodiment of the invention may function to estimate information on a golf swing posture of the user on the basis of the determination criterion adjusted by the determination criterion adjustment unit 110 according to one embodiment of the invention.

Specifically, according to one embodiment of the invention, the information on the user's golf swing posture may include a problem such as a head-up, early extension, or sway. Further, the swing information estimation unit 120 according to one embodiment of the invention may estimate the problem on the basis of the determination criterion adjusted by the determination criterion adjustment unit 110 according to one embodiment of the invention, and provide information on the estimated problem to the user. However, the information on the user's golf swing posture according to one embodiment of the invention is not limited to those listed above, and may be diversely changed as long as the objects of the invention may be achieved.

Further, the swing information estimation unit 120 according to one embodiment of the invention may function to estimate the information on the user's golf swing posture using rule-based learning. According to one embodiment of the invention, the rule-based learning may include, but is not limited to, decision tree learning. The decision tree learning refers to learning that is performed using a decision tree formed by schematizing rules and outcomes in a tree structure.

Meanwhile, the information on the user's golf swing posture according to one embodiment of the invention may be estimated separately for each partial motion constituting the golf swing.

Specifically, the golf swing according to one embodiment of the invention may be composed of eight stages of partial motions such as an address, a takeaway, a back swing, a top-of-swing, a down swing, an impact, a follow-through, and a finish. Further, the information on the user's golf swing posture according to one embodiment of the invention may be estimated separately for each partial motion constituting the golf swing.

Further, the swing information estimation unit 120 according to one embodiment of the invention may derive to which of the above eight stages the photographed image of the user's golf swing corresponds, or extract at least one frame corresponding to a specific stage among the eight stages from the photographed image of the user's golf swing, with reference to at least one of a type of the at least one joint of the user detected by the determination criterion adjustment unit 110 according to one embodiment of the invention, a position of the at least one joint of the user, a distance between the at least one joint of the user and at least one other joint of the user, and an angle formed between the at least one joint of the user and at least one other joint of the user. Therefore, the swing information estimation unit 120 according to one embodiment of the invention may function to estimate the information on the user's golf swing posture separately for each partial motion constituting the golf swing.

Meanwhile, the golf swing according to one embodiment of the invention is not necessarily separated into the eight stages as described above. That is, it may be separated to further include detailed stages constituting each of the eight stages, or such that at least some of the eight stages constitute one stage.

Next, the communication unit 130 according to one embodiment of the invention may function to enable data transmission/reception from/to the determination criterion adjustment unit 110 and the swing information estimation unit 120.

Lastly, the control unit 140 according to one embodiment of the invention may function to control data flow among the determination criterion adjustment unit 110, the swing information estimation unit 120, and the communication unit 130. That is, the control unit 140 according to the invention may control data flow into/out of the device 100 or data flow among the respective components of the device 100, such that the determination criterion adjustment unit 110, the swing information estimation unit 120, and the communication unit 130 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a mobile device for estimating information on a golf swing posture, the mobile device comprising one or more processors and the method comprising the steps of:

by the one or more processors, light-weighting an artificial neural network model using depthwise convolution and pointwise convolution to obtain a light-weighted artificial neural network model, wherein a depth of each kernel in the depthwise convolution is reduced to 1 and each of a width and a height of each kernel in the pointwise convolution is reduced to 1;

by the one or more processors, photographing a two-dimensional image of the user's golf swing using a camera;

by the one or more processors, generating a two-dimensional heat map by inputting the two-dimensional image to the light-weighted artificial neural network model, wherein a value of each pixel of the two-dimensional heat map indicates a probability that corresponding pixel corresponds to a joint of the user;

by the one or more processors, estimating a trajectory of a golf ball according to the user's golf swing from the photographed image using the light-weighted artificial neural network model;

by the one or more processors, adjusting a determination criterion for a golf swing of a user on the basis of the two-dimensional heat map;

by the one or more processors, estimating information on a golf swing posture of the user on the basis of the adjusted determination criterion; and by the one or more processors, pointing out a problem in the user's golf swing posture to the user with reference to the information on the golf swing posture, wherein in the adjusting step, the determination criterion is adjusted on the basis of the trajectory of the golf ball, wherein in the adjusting step, a ball flight of the golf ball is determined on the basis of the trajectory of the golf ball, and the determination criterion is adjusted with reference to the determined ball flight, and wherein in the adjusting step, the determination criterion is more tightly adjusted in response to determining that the user's golf swing posture is more likely to have a problem influencing the ball flight of the golf ball, with reference to the photographed image.

2. The method of claim 1, wherein in the adjusting step, the determination criterion is adjusted on the basis of information on the user's actual body, which is estimated from the photographed image using an artificial neural network model.

3. The method of claim 2, wherein in the adjusting step, the information on the actual body is estimated with reference to at least one joint of the user detected from the photographed image.

4. The method of claim 1, wherein in the adjusting step, the determination criterion is adjusted with reference to the probability.

5. The method of claim 4, wherein in the adjusting step, when a probability of the joint being located in a specific position is not greater than a threshold value, the determination criterion is adjusted such that the information on the user's golf swing posture is not estimated.

6. The method of claim 1, wherein in the adjusting step, the determination criterion is adjusted with reference to characteristics of a swing posture of a comparison target golfer selected by the user, which are estimated on the basis of information on the comparison target golfer's swing posture.

7. A non-transitory computer-readable recording medium having stored thereon a computer program for executing the method of claim 1.

8. A mobile device for estimating information on a golf swing posture, the mobile device comprising one or more processors configured to:

light-weight an artificial neural network model using depthwise convolution and pointwise convolution to obtain a light-weighted artificial neural network model, wherein a depth of each kernel in the depthwise convolution is reduced to 1 and each of a width and a height of each kernel in the pointwise convolution is reduced to 1;

photograph a two-dimensional image of the user's golf swing using a camera;

generate a two-dimensional heat map by inputting the two-dimensional image to the light-weighted artificial neural network model, wherein a value of each pixel of the two-dimensional heat map indicates a probability that corresponding pixel corresponds to a joint of the user;

estimate a trajectory of a golf ball according to the user's golf swing from the photographed image using the light-weighted artificial neural network model;

adjust a determination criterion for a golf swing of a user on the basis of the two-dimensional heat map;

estimate information on a golf swing posture of the user on the basis of the adjusted determination criterion; and point out a problem in the user's golf swing posture to the user with reference to the information on the golf swing posture, wherein the one or more processors are configured to adjust the determination criterion on the basis of the trajectory of the golf ball, wherein the one or more processors are configured to determine a ball flight of the golf ball on the basis of the trajectory of the golf ball, and adjust the determination criterion with reference to the determined ball flight, and wherein the one or more processors are configured to more tightly adjust the determination criterion in response to determining that the user's golf swing posture is more likely to have a problem influencing the ball flight of the golf ball, with reference to the photographed image.

9. The mobile device of claim 8, wherein the one or more processors are configured to adjust the determination criterion on the basis of information on the user's actual body, which is estimated from the photographed image using an artificial neural network model.

10. The mobile device of claim 9, wherein the one or more processors are configured to estimate the information on the actual body with reference to at least one joint of the user detected from the photographed image.

11. The mobile device of claim 8, wherein the one or more processors are configured to adjust the determination criterion with reference to the probability.

12. The mobile device of claim 11, wherein the one or more processors are configured to, when a probability of the joint being located in a specific position is not greater than a threshold value, adjust the determination criterion such that the information on the user's golf swing posture is not estimated.

13. The mobile device of claim 8, wherein the one or more processors are configured to adjust the determination criterion with reference to characteristics of a swing posture of a comparison target golfer selected by the user, which are estimated on the basis of information on the comparison target golfer's swing posture.

* * * * *